United States Patent
Luik et al.

(10) Patent No.: US 10,252,344 B2
(45) Date of Patent: Apr. 9, 2019

(54) CUTTING TOOL

(71) Applicant: Hartmetall-Werkzeugfabrik Paul Horn GmbH, Tuebingen (DE)

(72) Inventors: Matthias Luik, Reutlingen (DE); Daniel Herrmann, Moessingen (DE)

(73) Assignee: Hartmetall-Werkzeugfabrik Paul Horn GmbH, Tuebingen (DE)

(*) Notice: Subject to any disclaimer, the term of this patent is extended or adjusted under 35 U.S.C. 154(b) by 0 days.

(21) Appl. No.: 15/621,207

(22) Filed: Jun. 13, 2017

(65) Prior Publication Data
US 2017/0282255 A1   Oct. 5, 2017

Related U.S. Application Data

(63) Continuation of application No. PCT/EP2015/079785, filed on Dec. 15, 2015.

(30) Foreign Application Priority Data

Dec. 18, 2014   (DE) .................. 10 2014 119 094

(51) Int. Cl.
*B23B 27/16* (2006.01)
*B23B 27/04* (2006.01)
(Continued)

(52) U.S. Cl.
CPC .......... *B23B 27/1666* (2013.01); *B23B 27/04* (2013.01); *B23B 27/08* (2013.01);
(Continued)

(58) Field of Classification Search
CPC ... B23B 2205/02; B23B 27/04; B23B 29/043; B23B 27/1611; B23B 2260/132;
(Continued)

(56) References Cited

U.S. PATENT DOCUMENTS 1,934,465 A * 11/1933 Hillner .................. B23C 5/2441
144/230
2,085,095 A * 6/1937 Grattan ................. B23C 5/2455
407/38
(Continued)

FOREIGN PATENT DOCUMENTS

BE   883845 A1   10/1980
CN   2647475      10/2004
(Continued)

OTHER PUBLICATIONS

International Search Report for International Application No. PCT/EP2015/079785, dated Feb. 16, 2016.
(Continued)

*Primary Examiner* — Sara Addisu
(74) *Attorney, Agent, or Firm* — Jason H. Vick; Sheridan Ross, PC (57) ABSTRACT

Tool for machining a workpiece having a cutting insert with at least one cutting edge. Moreover, the tool has a tool holder, which extends along a holder longitudinal axis and has at a workpiece-side end a cutting insert receptacle for receiving the cutting insert, the cutting insert receptacle having an upper clamping finger and a lower clamping jaw. Furthermore, the tool has a wedge-shaped clamping element, which is fastenable in the cutting insert receptacle for wedging the cutting insert in the tool holder. In addition, the tool comprises a fastening element for fastening the clamping element in the cutting insert receptacle and for wedging the cutting insert in the tool holder.

12 Claims, 3 Drawing Sheets

(51) Int. Cl.
    *B23B 27/08*     (2006.01)
    *B23B 29/04*     (2006.01)

(52) U.S. Cl.
    CPC ........ *B23B 29/043* (2013.01); *B23B 2205/02* (2013.01); *B23B 2205/04* (2013.01); *B23B 2222/28* (2013.01); *B23B 2222/84* (2013.01); *B23B 2260/056* (2013.01); *B23B 2260/146* (2013.01)

(58) Field of Classification Search
    CPC ............... B23B 27/1666; B23B 27/08; B23B 2222/28; B23B 2222/84; B23B 2260/056; B23B 2260/146; Y10T 407/226; Y10T 407/2284
    See application file for complete search history.

(56) References Cited

U.S. PATENT DOCUMENTS

| | | | | |
|---|---|---|---|---|
| 2,240,360 | A * | 4/1941 | Whitman | B23C 5/2465 407/38 |
| 2,275,326 | A * | 3/1942 | Severson | B23B 27/16 407/108 |
| 2,488,172 | A | 11/1949 | Catlin, Sr. et al. | |
| 2,547,789 | A | 4/1951 | Skeel | |
| 2,573,480 | A | 10/1951 | Nusshold | |
| 2,584,505 | A * | 2/1952 | Severson | B23B 27/1633 407/100 |
| 2,659,963 | A * | 11/1953 | Severson | B23B 27/1629 407/108 |
| 2,779,992 | A * | 2/1957 | Hayes | B23B 27/16 407/107 |
| 3,531,842 | A | 10/1970 | Bowling | |
| 3,578,742 | A * | 5/1971 | Manthei | B23C 5/20 407/101 |
| 4,078,868 | A * | 3/1978 | Erkfritz | B23C 5/2208 407/104 |
| 4,329,091 | A * | 5/1982 | Erkfritz | B23C 5/2441 407/108 |
| 4,437,802 | A * | 3/1984 | Hall, Jr. | B23B 27/164 407/36 |
| 4,580,930 | A | 4/1986 | Zinner | |
| 5,171,109 | A * | 12/1992 | Arai | B23C 5/006 407/101 |
| 5,176,191 | A * | 1/1993 | Owens | B27G 13/04 144/218 |
| 5,810,518 | A * | 9/1998 | Wiman | B23B 27/065 407/102 |
| 5,924,826 | A * | 7/1999 | Bystrom | B23B 27/1625 407/103 |
| 5,988,952 | A * | 11/1999 | Antoun | B23B 27/04 407/107 |
| 6,244,790 | B1 * | 6/2001 | Kingdom | B23B 27/045 407/108 |
| 6,840,716 | B2 * | 1/2005 | Morgulis | B23C 5/109 407/103 |
| 6,926,472 | B2 * | 8/2005 | Arvidsson | B23B 27/12 407/110 |
| 7,845,256 | B2 * | 12/2010 | Pantzar | B23B 27/1611 407/113 |
| 2004/0101371 | A1 * | 5/2004 | Arvidsson | B23C 5/109 407/48 |
| 2005/0158132 | A1 * | 7/2005 | Pantzar | B23C 3/30 407/48 |
| 2005/0196244 | A1 * | 9/2005 | Takiguchi | B23B 51/02 408/231 |
| 2008/0145159 | A1 * | 6/2008 | Benson | B23B 27/164 407/114 |
| 2010/0158622 | A1 | 6/2010 | Kaufmann | |
| 2013/0156516 | A1 | 6/2013 | Hecht | |
| 2015/0246397 | A1 | 9/2015 | Voege | |

FOREIGN PATENT DOCUMENTS

| | | |
|---|---|---|
| DE | 3531767 A1 | 4/1986 |
| DE | 102006059717 A1 | 6/2008 |
| DE | 102012024485 A1 | 6/2013 |
| DE | 102012111240 A1 | 5/2014 |
| EP | 0095062 B1 | 10/1986 |
| GB | 1255944 | 12/1971 |
| SU | 908542 A1 | 2/1982 |

OTHER PUBLICATIONS

International Preliminary Report on Patentability for International Application No. PCT/EP2015/079785, dated Jun. 29, 2017.
Office Action for corresponding Chinese Patent Application No. 201580069332.8, dated Jun. 21, 2018.

* cited by examiner

CUTTING TOOL

CROSS REFERENCES TO RELATED APPLICATIONS

This application is a continuation of international patent application PCT/EP2015/079785, filed on Dec. 15, 2015 designating the U.S., which international patent application has been published in German language and claims priority from German patent application DE 10 2014 119 094.7, filed on Dec. 18, 2014. The entire contents of these priority applications are incorporated herein by reference.

BACKGROUND OF THE INVENTION

This disclosure relates to a cutting tool comprising a holder and a cutting insert arranged exchangeably in the holder.

Cutting tools of this type are employed mostly in metalworking applications, in particular in milling or turning applications. Cutting tools according to the present disclosure are used in particular for plunge-cut turning or longitudinal turning.

In order to ensure optimal metal cutting characteristics, an insert seat which is stable from a mechanical viewpoint, i.e. a mechanically stable receptacle of the cutting insert within the tool holder, is of immense importance. To this end, the cutting inserts which are used are mostly held clamped or wedged in a cutting insert receptacle provided in the tool holder, between an upper clamping finger and a lower clamping jaw. A further important aspect which it is important to ensure is a simple and rapid exchangeability of the cutting insert, since this must be frequently exchanged due to wear.

For the type of clamping of the cutting insert in the tool holder, a multiplicity of widely differing solutions already exists in the prior art.

From DE 10 2006 059 717 A1, a tool in which the cutting insert is clamped in a cutting insert receptacle with the aid of a clamping screw is known, for instance. To this end, in the upper clamping finger is provided a separating slot, which enables the upper clamping finger, when the clamping screw is screwed in, to be at least partially deformed to allow this upper clamping finger to be pressed from above onto the cutting insert.

EP 0 095 062 B1 shows a tool in which the cutting insert is clamped between the upper clamping finger and the lower clamping jaw without the aid of an additional clamping screw. The type of clamping which is shown therein makes use of the principle of self-locking, wherein the upper clamping finger, due to its pretensioning, presses from above onto the cutting insert in a manner similar to a spring. Although no extra clamping screw is required for the clamping, such a tool is disadvantageous, however, in various respects. On the one hand, the self-locking clamping, in the presence of relatively high machining forces, comes up against its limits. On the other hand, a type of clamping slot has likewise to be provided in the tool holder in order to ensure the resilient or self-locking property of the upper clamping finger. Depending on the geometry, such clamping slots can be thoroughly complex in terms of production. Furthermore, nor can the exchangeability of the cutting insert be readily easily ensured. For the exchanging of the cutting insert, a special tool key must namely be used, by means of which the upper clamping finger is expanded in order to release the cutting insert from the tool holder.

A further fastening variant of a cutting insert in the tool holder is known from DE 10 2012 111 240 A1. This document shows a tool comprising a substantially arc-shaped cutting insert, which is clamped in an arc-shaped cutting insert receptacle. The arc-shaped shank of the cutting insert and the arc-shaped cutting insert receptacle are here configured such that the cutting insert, when pushed or rotated into the cutting insert receptacle, is with increasing rotation clamped firmly in the tool holder. Although this type of clamping enables a relatively stable insert seat, such a cutting insert or such a cutting insert receptacle, due to the arc-shaped geometry, is relatively complex in production engineering terms.

In particular for the field of heavy-duty metal cutting, there is therefore demand for alternative types of clamping of a cutting insert on the tool holder, wherein the clamping should enable an extremely stable insert seat. The term heavy-duty metal cutting can be used if workpieces with large and varying machining allowances, machining depths over 25 mm and/or machining widths greater then <8 mm are cut. By heavy-duty metal cutting is also understood the machining of materials which are difficult to cut, such as titanium or nickel-based alloys.

SUMMARY OF THE INVENTION

It is an object to provide a cutting tool offering an alternative type of clamping of the cutting insert in the tool holder. The type of clamping should be particularly suitable for use in the presence of high machining forces. Moreover, the type of clamping should ensure easy exchangeability of the cutting insert and be easy to produce from a production engineering viewpoint.

In view of this object, a tool for machining a workpiece is presented, comprising a cutting insert having at least one cutting edge; a tool holder, which extends along a holder longitudinal axis and has at a workpiece-side end a cutting insert receptacle for receiving the cutting insert, the cutting insert receptacle having an upper clamping finger and a lower clamping jaw, and the tool holder having a first internal thread; a wedge-shaped clamping element, which is fastenable in the cutting insert receptacle for wedging the cutting insert in the tool holder, wherein the clamping element has on a top side a first bearing portion for bearing against the cutting insert, which first bearing portion extends along a first bearing axis, and wherein the clamping element has a second bearing portion for bearing against the lower clamping jaw, which second bearing portion extends along a second bearing axis that runs transverse to the first bearing axis, and wherein the clamping element comprises a bore that extends parallel to the second bearing axis; and further comprising a screw for fastening the clamping element in the cutting insert receptacle. In the mounted state of the tool, the clamping element is disposed between the cutting insert and the lower clamping jaw of the tool holder, the second bearing axis runs parallel to the holder longitudinal axis, and the screw is screwed through the bore of the clamping element into the first internal thread of the tool holder According to the disclosure a wedge-shaped clamping element, which is fastenable in the cutting insert receptacle of the tool holder with the aid of a screw, is thus used. This wedge-shaped clamping element serves to wedge the cutting insert in the tool holder. The wedge-shaped clamping element is a separate component, which, jointly with the cutting insert, is fastenable in the cutting insert receptacle of the tool holder. The cutting insert itself is not fixedly connected to the wedge-shaped clamping element. For the exchanging of the cutting insert, the clamping element, by release of the fastening means, can be separated from the tool holder, whereby also the clamping of the cutting insert between clamping element and tool holder is released and the clamping element is removable by manual or mechanical means.

The clamping element of the tool according to the present disclosure is herein described as "wedge-shaped", which relates in particular to its geometric design, viewed in side view. In its overall geometry, the clamping element is preferably of prismatic design or trapezoidal in side view.

The inventive wedging of the cutting insert in the tool holder with the aid of the wedge-shaped clamping element proves advantageous in particular for the following reasons: On the one hand, an extremely stable insert seat is realized by this type of wedging. The tool according to the present disclosure is therefore also suitable for heavy-duty metal cutting. On the other hand, the tool, inclusive of tool holder, cutting insert and wedge-shaped clamping element, can be produced relatively cheaply and easily in production engineering terms. The cutting insert, moreover, following wear or for other reasons, is able to be released from the tool holder relatively easily with just a few simple maneuvers. Both the upper clamping finger and the lower clamping jaw can be of rigid design, which has an advantageous effect on their mechanical stability.

The clamping element, in the mounted state of the tool, is disposed between the cutting insert and the lower clamping jaw of the tool holder.

The clamping element is thus arranged beneath the cutting insert in the cutting insert receptacle. Instead of an arrangement above the cutting insert, this gives the advantage that the clamping element is disposed on the lower clamping jaw, which is usually configured more stable than the upper clamping finger. As a result of this design, space is equally saved in the upper region of the cutting insert receptacle, so that the upper clamping finger is able to be configured larger and more stable. This is in particular of advantage, since the upper clamping finger, in contrast to most tools known from the prior art, is preferably of rigid design, i.e. is not pliable or not expandable. For the simple reason that there is no separating slot, the expandability of the cutting insert receptacle or of the upper clamping finger is not given.

The clamping element has on a top side a first bearing portion for bearing against the cutting insert, which first bearing portion extends substantially along a first bearing axis. Moreover, the clamping element has a second bearing portion for bearing against the lower clamping jaw, which second bearing portion extends substantially along a second bearing axis. The two bearing axes preferably enclose an angle of less than 15°.

The wedge-shaped clamping element tapers preferably at an angle of less than 15°. This has in particular the advantage of producing a so-called self-locking. This self-locking results in the cutting insert, in the fully mounted state of the tool, thus when the clamping element is pushed fully into the cutting insert, not being able to be readily released from the tool holder, even if the screw is released. In other words, the cutting insert, in the mounted state, thus remains wedged between the upper clamping finger and the wedge-shaped clamping element, even when the screw is released. This prevents the cutting insert from accidentally falling out, for example during exchanging of the cutting insert. For the realization of this self-locking, in particular an angle between first and second bearing axis within the range of 5-10° is desired.

The second bearing portion, in the mounted state of the tool, runs parallel to the holder longitudinal axis.

The contact surfaces between clamping element and lower clamping jaw of the tool holder thus run parallel to the holder longitudinal axis. The bearing portion which is provided on the lower clamping jaw and which corresponds with the second bearing portion disposed on the clamping element is thus able to be produced cheaply and easily from a production engineering aspect, since it does not have to be inclined. Furthermore, as a result of a straight or horizontal bearing contact of the clamping element against the lower clamping jaw, an effective and well distributed force transmission into the tool holder is realized.

In a refinement, the clamping element, starting from a front end of the clamping element, extends along a longitudinal axis of the clamping element through to a rear end of the clamping element, wherein, in the mounted state of the tool, the longitudinal axis is preferably oriented parallel to the holder longitudinal axis, and the rear end is facing a base of the cutting insert receptacle, and wherein the clamping element tapers in a wedge shape, in its height perpendicular to the longitudinal axis, through to the rear end.

The width of the clamping element, which is likewise measured perpendicular to the longitudinal axis of the clamping element, is preferably constant along the whole of the longitudinal axis of the clamping element. The height of the clamping element, which is measured perpendicular to the longitudinal axis of the clamping element and perpendicular to the width of the clamping element, preferably steadily decreases, starting from the front end through to the rear end of the clamping element. This produces, during the fastening of the clamping element in the cutting insert receptacle, a type of wedging of the cutting insert, which results in the cutting insert becoming wedged in the tool holder. During the fastening of the clamping element, the clamping element is drawn further and further into the cutting insert receptacle, whereby the clamping force exerted on the cutting insert is increasingly heightened.

It should be pointed out that the height of the clamping element, starting from the front end through to the rear end of the clamping element, does not necessarily have to steadily decrease. In principle, it is also conceivable that the clamping element tapers only in some sections along the longitudinal axis of the clamping element.

In a further refinement, the first bearing portion has a groove-shaped recess, which runs transversely to the first bearing axis and which divides the first bearing portion into two segments.

This division of the first bearing portion into two segments proves advantageous, in particular with regard to the stability of the bearing contact of the wedge-shaped clamping element against the upper clamping finger. Namely, a defined bearing contact is obtained in two subregions, in the region of the front end of the clamping element and in the region of the rear end of the clamping element. As a result, production tolerances are also able to be compensated.

According to a further refinement, each of the first and the second bearing portion has, viewed perpendicular to the longitudinal axis of the clamping element, a prismatic cross section.

Each of the first and second bearing portion is preferably formed by at least three faces, which result in the prismatic cross section. The resulting prismatic cross section of the two bearing portions is preferably of symmetrical design.

According to a first alternative, the prismatic cross sections can be configured as so-called internal prisms, i.e. can be formed by a groove-shaped, prismatic recess in the clamping element. According to a second alternative, the prismatic cross sections can be configured as so-called external prisms, i.e. can be formed by prismatic elevations on the clamping element. Correspondingly thereto, the bearing portions on the cutting insert and on the lower clamping jaw are configured as prismatic counterparts (external prisms or internal prisms).

As a result of cross sections of this type, in particular transverse and shearing forces are able to be effectively absorbed without an unwanted release of the cutting insert and/or the clamping element from the cutting insert receptacle being able to ensue during the machining. This likewise helps to achieve a stable insert seat.

In the mounted state of the tool, the screw is preferably oriented parallel to the holder longitudinal axis.

The screw is thus able to be inserted relatively easily through the clamping element into the tool holder and screwed down in order to wedge the cutting insert in the tool holder with the aid of the clamping element. To this end, the clamping element has a bore, the bore axis of which, in the mounted state, is preferably oriented parallel to the holder longitudinal axis. The bore in the clamping element can be configured either as a through bore or as a stepped bore. The former is easier to realize in production engineering terms.

According to another refinement, the screw has a first and a second external thread, wherein the first internal thread that is arranged in the tool holder corresponds with the first external thread of the screw, and wherein the clamping element has a second internal thread, which corresponds with the second external thread. The second internal thread arranged in the clamping element is preferably made in the bore provided in the clamping element.

Through the provision of internal threads both in the tool holder and in the clamping element, high clamping forces are able to be transmitted by means of the screw. Clamping element and cutting insert thus remain securely in their mounted position even if high machining forces are generated.

In a further refinement, the first external thread is in opposite sense to the second external thread.

According to this refinement, the screw thus has two oppositely running external threads, which are mutually separated, in the region of the middle of the screw, preferably by a peripheral groove. Such screws are frequently also referred to as differential screws. It is evident that, according to this refinement, the first internal thread provided in the tool holder and the second internal thread provided in the clamping element are configured correspondingly to the two external threads of the screw, likewise in opposite sense to one another other.

The opposite-sense configuration of the internal and external thread has the advantage that the clamping element, during the release of the differential screw, is actively pushed out of the cutting insert receptacle. Clamping element and cutting insert are thus able to be more easily removed during the cutting insert exchange. At the same time, this type of design also has the advantage that the clamping element, during the tightening of the differential screw and during the mounting of the clamping element and of the cutting insert, is drawn into the cutting insert receptacle already by means of fewer revolutions of the differential screw.

The first and the second external thread and the first and the second internal thread can also have different leads. This can in principle be combined with the opposite-sense configuration of the external and internal threads. According to a further alternative, it is also possible to design the two internal and external threads in this case in same sense.

According to a further refinement, the clamping element is made of steel, and the cutting insert of cemented carbide. The tool holder is preferably likewise made of steel. As a result, the stability of the connection between tool holder, cutting insert and clamping element is improved.

According to a further refinement, an end face arranged at the front end of the clamping element, in the mounted state of the tool, is aligned with an end face arranged at the workpiece-side end of the lower clamping jaw.

In the mounted state of the tool, the front end of the cutting insert, on which at least one cutting edge is usually arranged, preferably protrudes from these two end faces. During the machining, unwanted collisions between workpiece and clamping wedge or tool holder are hereby able to be avoided.

It is evident that the aforementioned features and the features yet to be described below are usable not only in the respectively specified combination, but also in other combinations or in isolation, without departing from the spirit and scope of the present disclosure.

DESCRIPTION OF PREFERRED EMBODIMENTS

Figure 1:
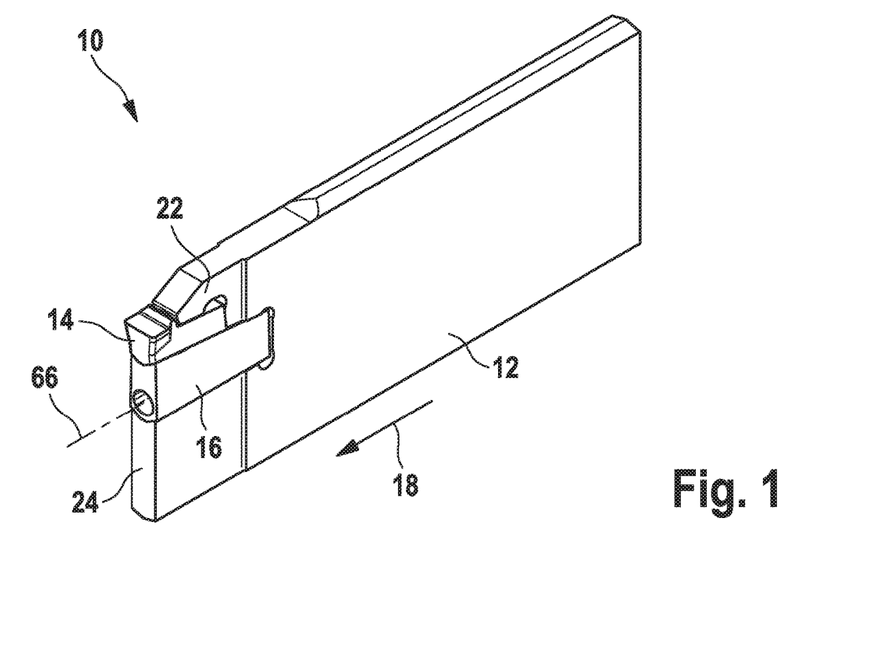
FIG. 1 shows a perspective view of an illustrative embodiment of the tool according to the present disclosure.
Figure 2:
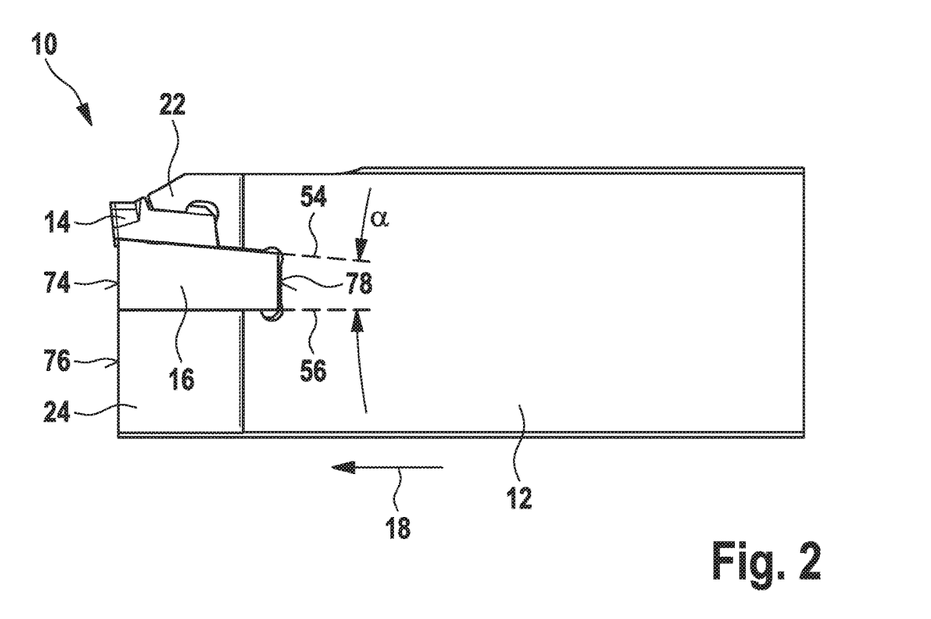
FIG. 2 shows a side view of the illustrative embodiment of the tool.
Figure 3:
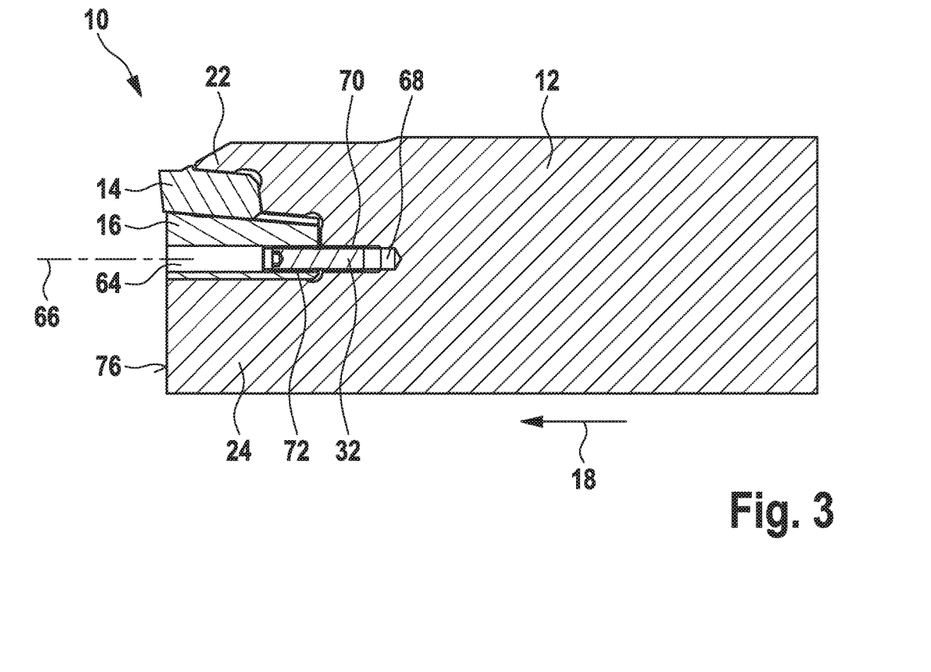
FIG. 3 shows a sectional view of the illustrative embodiment of the tool.

FIGS. 1-3 show an illustrative embodiment of the herein presented tool in a perspective view, a side view, and in a sectional view. The tool is therein denoted in its entirety by the reference numeral 10. FIGS. 1-3 show the tool 10 in its mounted state.

The tool 10 has a tool holder 12 and an exchangeable cutting insert 14, which is fastenable in or to the tool holder 12 with the aid of a substantially wedge-shaped clamping element 16.

Figure 4:
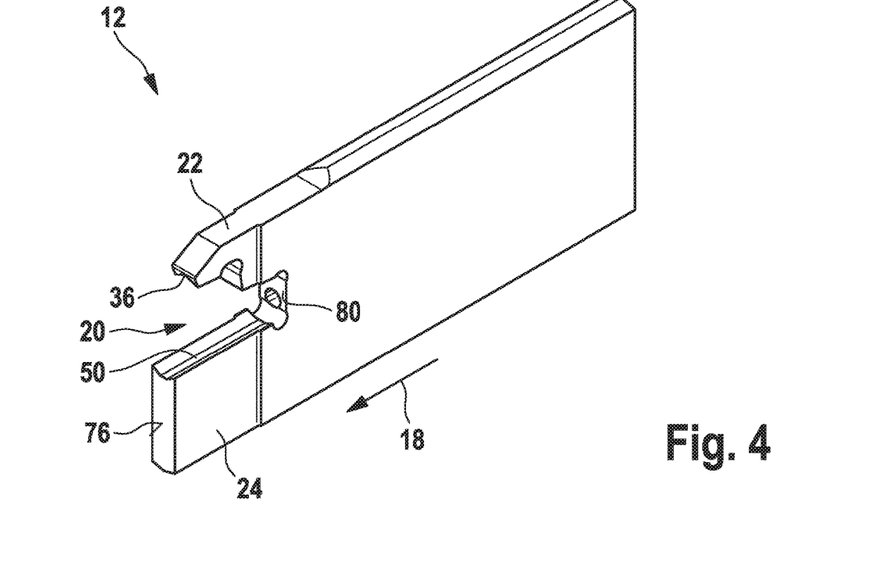
FIG. 4 shows a perspective view of a tool holder of the tool according to an illustrative embodiment.

The tool holder 12 extends substantially along a holder longitudinal axis 18 and has in the region of its front or workpiece-side end a cutting insert receptacle 20 (see FIG. 4). Although this receptacle, for the sake of simplicity, is in the present case referred to as a cutting insert receptacle 20, it not only to receive the cutting insert 14, but also to receive the clamping element 16.

The cutting insert receptacle 20 is defined by an upper clamping finger 22 and a lower clamping jaw 24. The upper clamping finger 22 and the lower clamping jaw 24 are situated one opposite the other, so that they jointly form a substantially mouth-shaped receptacle. Both the upper clamping finger 22 and the lower clamping jaw 24 are preferably of rigid design. The upper clamping finger 22 is thus unable, in contrast to most tools of this type which are known from the prior art, to expand upward for the mounting of the cutting insert 24. It is evident that, in particular in the presence of very high machining forces, minor elastic deformations of the upper clamping finger can nevertheless ensue, which deformations are not intended, let alone necessary for the mounting. An elastic deformation of the upper clamping finger is in any event not necessary for the clamping of the cutting insert and, as a result of the absent separating slot, is negligibly small. Preferably, the upper clamping finger 22 is configured smaller than the lower clamping jaw 24, since the latter must absorb a large part of the machining forces during the machining.

Figure 5:
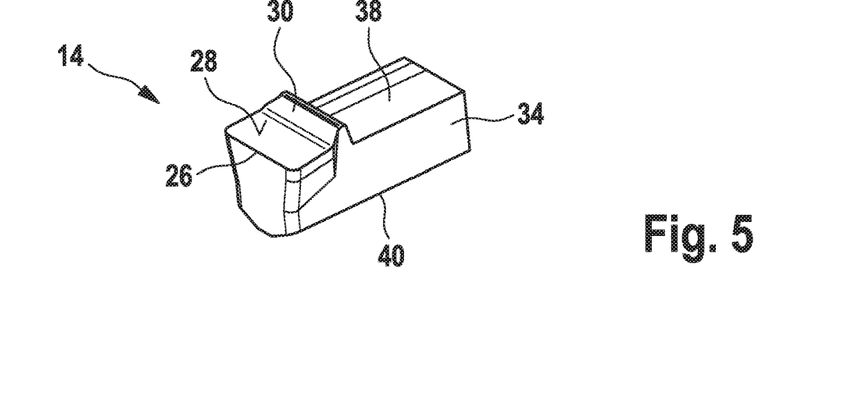
FIG. 5 shows a perspective view of a cutting insert of the tool according to an illustrative embodiment.

The cutting insert 14 has at least one cutting edge 26 (see FIG. 5), by means of which the tool 10 makes contact with and works the workpiece (not shown) during the machining. It is evident that the cutting insert 14 can in principle have a plurality of cutting edges (primary and secondary cutting edges). Adjacent to the cutting edge 26, the cutting insert 14 has on its top side a rake surface 28, which serves for the chip deflection and chip formation. Depending on the intended application, this rake surface 28 can in principle have a wide variety of chip-breaking geometries. At the rear end of the rake surface 28, which rear end lies opposite the cutting edge 26, is preferably arranged a chip deflection step 30, which runs obliquely or transversely to the rake surface 28 (see FIG. 5). During the machining, the chip hence flows off from the cutting edge 26 via the rake surface 28, and finally, via the chip deflection step 30, upward over the front end of the clamping finger 22.

The tool 10 is substantially characterized by the specific nature of the clamping of the cutting insert 14 in the tool holder 12. For the clamping of the cutting insert 14, the clamping element 16 is used. An illustrative embodiment of the clamping element 16 is in detail in FIG. 6. Both the cutting insert 14 and the clamping element 16 are provided as separate, exchangeable components.

Figure 7:
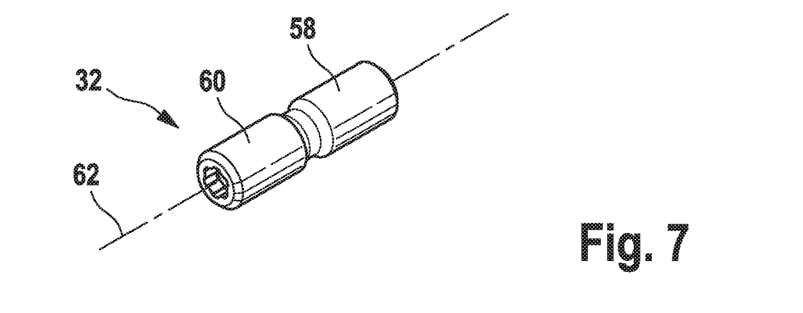
FIG. 7 shows a perspective view of a fastening element of the tool according to an illustrative embodiment.

The substantially wedge-shaped clamping element 16 is able to be fitted or fastened in the cutting insert receptacle 20 of the tool holder 12 with the aid of a fastening element 32. The fastening element 32 is preferably configured as a screw. An illustrative embodiment of this fastening element 32 is represented in FIG. 7.

In the mounted state of the tool 10, the clamping element 16 is disposed beneath the cutting insert 14 and clamped between the cutting insert 14 and the lower clamping jaw 24 (see FIGS. 1-3). The cutting insert 14 is wedged between the upper clamping finger 22 and the clamping element 16. More precisely, the shank 34 of the cutting insert 14 is clamped in place between the upper clamping finger 22 and the wedge-shaped clamping element 16. To this end, the upper clamping finger 22 has on its bottom side one or more bearing surfaces, which are jointly referred to as the bearing portion 36 of the upper clamping finger 22 (see FIG. 4). This bearing portion 36 corresponds with an upper bearing portion 38 disposed on the top side of the shank 34 of the cutting insert 14, which bearing portion is likewise formed by one or more faces.

Preferably, the two bearing portions 36, 38, which correspond with one another, have a prismatic cross section which is substantially symmetrical to the holder longitudinal axis 18 or symmetrical to the longitudinal axis of the cutting insert 14. In the illustrative embodiment which is shown in the present case, the bearing portion 36 of the upper clamping finger 22 is configured as a groove-shaped, prismatic recess (see FIG. 4). By contrast, the thereto corresponding upper bearing portion 38 of the cutting insert 14 is configured as a prismatic elevation. In principle, this can also, however, conversely be the case, so that the bearing portion 36 is configured as an elevation and the bearing portion 38 as a thereto corresponding groove.

On the bottom side of the shank 34 of the cutting insert 14 is arranged a lower bearing portion 40 (see FIG. 5), which likewise has a prismatic cross section. This lower bearing portion 40 of the cutting insert 14 serves to bear against the clamping element 16. The clamping element 16 has a thereto corresponding upper bearing portion 42, which is disposed on the top side 44 of the clamping element 16 (see FIG. 6). This bearing portion 42 of the clamping element 16 likewise has a prismatic cross section and is formed by one or more faces placed obliquely to one another. According to the shown illustrative embodiment, the lower bearing portion 40 of the cutting insert 14 is configured as an external prism or elevation, and the upper bearing portion 42 of the clamping element 16 is configured as an internal prism or groove. Alternatively, it is here too possible, however, to design the lower bearing portion 40 of the cutting insert 14 as an internal prism and the upper bearing portion 44 of the clamping element 16 as an external prism.

On the bottom side 46 lying opposite the top side 44, the clamping element 16 has a lower bearing portion 48, which serves to bear against the lower clamping jaw 24. The lower clamping jaw 24 has a thereto corresponding bearing portion 50 (see FIG. 4). Both bearing portions 48, 50 preferably have, in turn, a prismatic cross section, which is formed by one or more faces placed obliquely to one another. Here too, the bearing portions 48, 50 can respectively be configured either as a prismatic groove (internal prism) or as a prismatic elevation (external prism).

Figure 6:
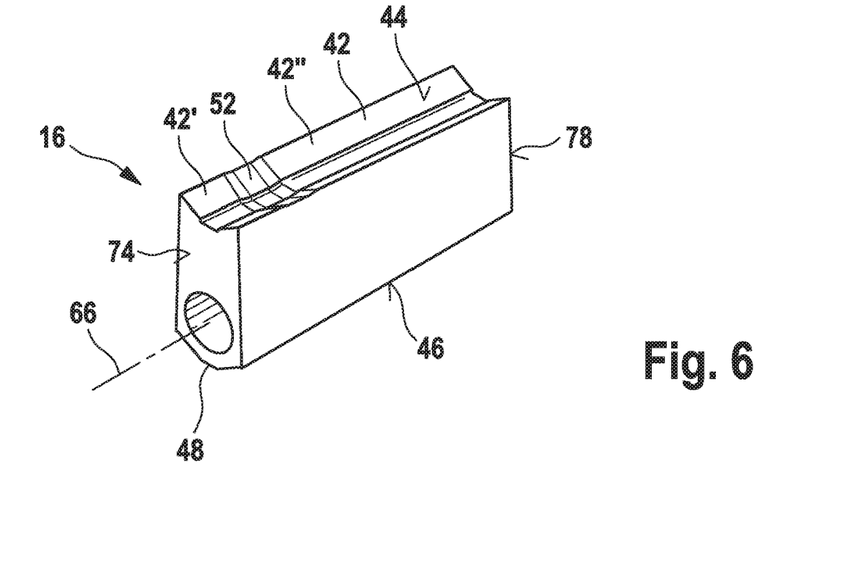
FIG. 6 shows a perspective view of a clamping element of the tool according to an illustrative embodiment.

The inventive nature of the wedging of the cutting insert 14 in the tool holder 12 with the aid of the wedge-shaped clamping element 16 ensures an extremely stable insert seat, for which reason the tool 10 is also well suited to heavy-duty metal cutting with high generated machining forces. For the better definition of the bearing contact of the cutting insert 14 against the clamping element 16, on the upper bearing portion 42, as shown in FIG. 6, can be provided a groove-shaped recess 52. This groove-shaped recess divides the upper bearing portion 42 of the clamping element 16 into a first and a second segment 42', 42". In this way, the cutting insert 14 rests in a defined manner in the front region and in the rear region of the clamping element 16.

The wedge-shaped geometry of the clamping element 16 is discernible, in particular, in FIGS. 2 and 3. As can be seen, for example, from FIG. 2, the upper bearing portion 42 of the clamping element 16 runs obliquely to the lower bearing portion 48 of the clamping element 16. The upper bearing portion 42 extends substantially along a first bearing axis 54, which, in the mounted state of the tool 10, runs transversely, thus non-parallel, to the holder longitudinal axis 18 of the tool holder 12. The lower bearing portion 48 of the clamping element 16 runs substantially along a second bearing axis 56, which, in the mounted state of the tool 10, runs horizontally, thus parallel, to the holder longitudinal axis 18 of the tool holder 12.

Preferably, the two bearing axes 54, 56 enclose an angle $\alpha$ of less than 15°. An angle $\alpha$ within the range of 5° to 10° is particularly preferred. Such a wedge-shaped taper of the clamping element 16 at the said angle $\alpha$ has the advantage that this results in a self-locking of the clamping element 16 or of the cutting insert 14. The cutting insert 14 therefore does not readily fall out of the cutting insert receptacle 20 once the fastening element 32 is released.

The fastening of the clamping element 16 is effected, as already mentioned, with the aid of the fastening element 32. The fastening element 32 is preferably configured as a screw. Particularly preferredly, the fastening element 32 is configured as a differential screw 32, as represented, by way of example, in FIG. 7. The differential screw 32 represented in FIG. 7 has on a first side a first external thread 58, and on a second side a second external thread 60. These two external threads 58, 60 preferably run coaxially to one another or coaxially to the longitudinal axis 62 of the differential screw 32. The first external thread 58 is, however, preferably configured in opposite sense to the second external thread 60. The two external threads can in principle also have different diameters.

In the mounted state of the tool 10, the screw 32, as can be seen in particular in FIG. 3, is screwed into the tool holder 12 through the clamping element 16. To this end, the clamping element 16 has a bore 64, which, according to the shown illustrative embodiment, is configured as a through bore. In the mounted state of the tool 10, the longitudinal axis 66 of the bore 64 runs preferably parallel to the holder longitudinal axis 18.

In the mounted state of the tool 10, the bore 64 provided in the clamping element 16 is aligned with a blind bore 68 provided in the tool holder 12. In this blind bore 68 is provided a first internal thread 70, which corresponds with the first external thread 58 made on the screw 32. According to the shown illustrative embodiment, in the through bore 64 of the clamping wedge 16 is also provided an internal thread 72, which in the present case is referred to as the second internal thread 72. The second internal thread 72 corresponds with the second external thread 60 arranged on the screw 32. Correspondingly to the two external threads 58, 60, the two internal threads 70, 72 according to the present illustrative embodiment are also configured in opposite sense to one another.

The opposite-sense configuration of the threads 58, 60 and 70, 72 yields several advantages. On the one hand, the clamping element 16 is able to be fixed on the tool holder 12 by means of fewer revolutions of the screw 32. On the other hand, the connection between clamping element 16 and tool holder 12 is thereby relatively stable, so that relatively large clamping forces are able to be transmitted to the cutting insert 14. Principally, the use of a differential screw 32 brings the advantage, however, that the clamping element 16, when the differential screw 32 is released, is automatically pushed out of the cutting insert receptacle 20. This facilitates the exchange of the cutting insert 14.

Although the use of such a differential screw 32 is preferred, in principle, however, a conventional screw is also able to be used as the fastening element 32. In this case, the two internal threads 70, 72 are configured in opposite sense, but with different lead. In principle, it is also possible, however, to provide just one internal thread 70 in the tool holder 12, whereas in the bore 64 of the clamping element 16 it is not absolutely necessary to provide an internal thread. In the latter case, it would in principle also suffice to design the bore 64 as a stepped bore and to use a conventional screw which acts with its flange or head on the step of the stepped bore.

Finally, it should be pointed that the end face arranged at the front end 74 of the clamping wedge 16, in the mounted state of the tool 10, is preferably aligned with the end face arranged at the front end 76 of the lower clamping jaw 24 (see FIG. 2). The rear end face provided at the rear end 78 of the clamping wedge 16 and lying opposite the front end face is facing the base 80 of the cutting insert receptacle 20, yet does not bear against this same.

What is claimed is:

1. A tool for machining a workpiece, comprising:
a cutting insert having at least one cutting edge;
a tool holder, which extends along a holder longitudinal axis from a first end to an opposite workpiece-side end and has at the workpiece-side end a cutting insert receptacle for receiving the cutting insert, the cutting insert receptacle having an upper clamping finger and a lower clamping jaw, and the tool holder having a first internal thread;
a wedge-shaped clamping element, which is fastenable in the cutting insert receptacle for wedging the cutting insert in the tool holder, wherein the clamping element has on a top side a first bearing portion for bearing against the cutting insert, wherein the first bearing portion extends along a first bearing axis, and wherein the clamping element has a second bearing portion for bearing against the lower clamping jaw, wherein the second bearing portion extends along a second bearing axis that runs at a non-parallel angle to the first bearing axis, and wherein the clamping element comprises a bore that extends parallel to the second bearing axis; and
a screw for fastening the clamping element in the cutting insert receptacle;
wherein, in the mounted state of the tool, the clamping element is disposed between the cutting insert and the lower clamping jaw of the tool holder, the second bearing axis runs parallel to the holder longitudinal axis, and the screw is screwed through the bore of the clamping element into the first internal thread of the tool holder.

2. The tool as claimed in claim 1, wherein the clamping element, starting from a front end, extends along a longitudinal axis of the clamping element through to a rear end, wherein, in the mounted state of the tool, the longitudinal axis is oriented parallel to the holder longitudinal axis, and the rear end is facing a base of the cutting insert receptacle, and wherein the clamping element tapers in a wedge shape, in its height perpendicular to the longitudinal axis, through to the rear end.

3. The tool as claimed in claim 2, wherein an end face arranged at the front end of the clamping element is, in the mounted state of the tool, aligned with an end face that is arranged at the workpiece-side end of the lower clamping jaw.

4. The tool as claimed in claim 1, wherein the non-parallel angle between the first bearing axis and the second bearing axis is arranged at an angle ($\alpha$) of less than 15°.

5. The tool as claimed in claim 1, wherein the first bearing portion is divided along the first bearing axis into a first segment and a second segment by a groove-shaped recess running perpendicular to the first bearing axis, and wherein the first segment is disposed closer to the workpiece-side end of the tool holder than the second segment.

6. The tool as claimed in claim 1, wherein each of the first and the second bearing portion has, viewed perpendicular to the longitudinal axis of the clamping element, a prismatic cross section.

7. The tool as claimed in claim 1, wherein, in the mounted state of the tool, the screw is oriented parallel to the holder longitudinal axis.

8. The tool as claimed in claim 1, wherein the screw has a first and a second external thread, wherein the first internal thread that is arranged in the tool holder corresponds with the first external thread, and wherein the clamping element has a second internal thread in the bore, which second internal thread corresponds with the second external thread.

9. The tool as claimed in claim 8, wherein the first external thread is in opposite sense to the second external thread.

10. The tool as claimed in claim 9, wherein the first and the second external thread have mutually different leads.

11. The tool as claimed in claim 1, wherein the clamping element is made of steel, and the cutting insert is made of cemented carbide.

12. The tool as claimed in claim 1, wherein the upper clamping finger and the lower clamping jaw are substantially rigid.

* * * * *